(12) United States Patent
Kato

(10) Patent No.: US 8,240,625 B2
(45) Date of Patent: Aug. 14, 2012

(54) MOUNTING STRUCTURE FOR FUNCTIONAL COMPONENT

(75) Inventor: Kouichi Kato, Kanagawa (JP)

(73) Assignee: Piolax Inc., Yokohama-Shi, Kanagawa (JP)

( * ) Notice: Subject to any disclaimer, the term of this patent is extended or adjusted under 35 U.S.C. 154(b) by 243 days.

(21) Appl. No.: 12/801,481

(22) Filed: Jun. 10, 2010

(65) Prior Publication Data

US 2010/0320347 A1 Dec. 23, 2010

(30) Foreign Application Priority Data

Jun. 19, 2009 (JP) .............................. P. 2009-146303

(51) Int. Cl.
*F16B 45/00* (2006.01)
(52) U.S. Cl. .................. 248/304; 248/224.7; 248/231.9; 296/1.02; 296/1.07
(58) Field of Classification Search .......... 248/27.1, 248/213.2, 220.21, 224.7, 231.9, 294.1, 304, 248/306, 307, 308; 296/152, 71, 72, 75, 296/97.6, 1.02, 1.07
See application file for complete search history.

(56) References Cited

U.S. PATENT DOCUMENTS

| | | | | |
|---|---|---|---|---|
| 2,202,857 A * | 6/1940 | Jacobs ............................ 296/75 |
| 4,221,354 A * | 9/1980 | Kempkers ................... 248/291.1 |
| 4,712,823 A * | 12/1987 | Mills et al. ................... 296/37.8 |
| 4,912,808 A * | 4/1990 | Blakely ........................... 16/422 |
| 5,975,606 A * | 11/1999 | Forbes et al. ................ 296/1.02 |
| 6,637,707 B1 * | 10/2003 | Gates et al. ................. 248/224.7 |
| 6,663,067 B2 * | 12/2003 | Gordon ....................... 248/294.1 |
| 6,935,601 B2 * | 8/2005 | Tanaka ....................... 248/294.1 |
| 6,959,954 B2 * | 11/2005 | Brandt et al. ................. 296/1.08 |
| 7,331,625 B2 * | 2/2008 | Kowalski et al. ............. 296/152 |
| 7,455,342 B2 * | 11/2008 | Lechkun et al. ................ 296/64 |
| 7,594,684 B2 * | 9/2009 | Hidaka et al. ................ 296/1.02 |
| 7,669,821 B2 * | 3/2010 | Martin ....................... 248/294.1 |
| 2005/0076471 A1 * | 4/2005 | Watanabe et al. ................ 16/66 |
| 2008/0157552 A1 * | 7/2008 | Shellhammer ............... 296/1.07 |
| 2011/0095156 A1 * | 4/2011 | Myers et al. .................. 248/341 |

FOREIGN PATENT DOCUMENTS

JP 4-74150 U 6/1992

* cited by examiner

*Primary Examiner* — Bradley Duckworth
(74) *Attorney, Agent, or Firm* — McGinn IP Law Group, PLLC

(57) ABSTRACT

According to one embodiment, a functional component mounting structure includes: a functional component having: a base body; a functional portion formed on a front surface of the base body; and a latching portion extending from a back surface of the base body; a component receiver having: a base portion having an opening into which the latching portion is inserted from a front surface side to a back surface side thereof; and a latch receiving portion on which the latching portion is latched; and a cover member pivotally fitted to the component receiver to open and close the opening.

6 Claims, 4 Drawing Sheets

MOUNTING STRUCTURE FOR FUNCTIONAL COMPONENT

CROSS-REFERENCE TO RELATED APPLICATION(S)

This application claims priority from Japanese Patent Application No. 2009-146303 filed on Jun. 19, 2009, the entire contents of which are incorporated herein by reference.

BACKGROUND

1. Field of the Invention

An aspect of the present invention relates to a structure for mounting a functional component having a functional portion such as a hook or an ETC (Electronic Toll Collection System) on-board unit on, for example, a cabin wall surface or a front panel of an automobile.

2. Description of the Related Art

JP-UM-H04-074150-A discloses a hanger mounting structure, as a mounting structure for functional components. In the mounting structure, a latching shoulder portion provided on the back surface side of a hanger (functional component) is latched onto a mounting hole pierced in a center pillar or the like in an automobile cabin.

In addition to the mounting structure disclosed in JP-UM-H04-074150-A, various proposals are made. However, there are no proposals regarding the mounting hole after the functional component has been removed. For example, some user may think that the functional component is not necessary and may even feel that the functional component (such as a hanger hook) projecting from the center pillar is obstructive. In such a case, although the functional component can be removed, the resulting appearance is unattractive as the mounting hole is simply exposed.

For example, a cap for closing the mounting hole may be prepared for a user who does not need the functional component. The functional component may be previously removed, and the mounting hole may be previously closed by the cap. However, sometimes, the functional component is remained mounted and then removed, or the automobile may be passed into another user as a second-hand car. In such a case, it is troublesome to keep the cap, and the cap may be lost.

SUMMARY

One of objects of the present invention is to provide a functional component mounting structure in which an opening (mounting hole) for mounting a functional component can be closed with a good appearance even after the functional component is removed, thereby eliminating the need for keeping a separate cap which is troublesome to keep and is easily lost.

According to a first aspect of the present invention, there is provided a functional component mounting structure including: a functional component having: a base body; a functional portion formed on a front surface of the base body; and a latching portion extending from a back surface of the base body; a component receiver having: a base portion having an opening into which the latching portion is inserted from a front surface side to a back surface side thereof; and a latch receiving portion on which the latching portion is latched; and a cover member pivotally fitted to the component receiver to open and close the opening.

According to a second aspect of the present invention, there may be provided the structure, wherein the functional component has a cover member fixing portion that contacts the cover member to restrict the cover member from pivoting, in a state where the latching portion of the functional component is latched on the latch receiving portion of the component receiver.

According to a third aspect of the present invention, there may be provided the structure, wherein the cover member fixing portion has a pair of contact portions that press both opposite portions of the cover member across a pivot center thereof to provide moments in opposite directions, respectively.

According to a fourth aspect of the present invention, there may be provided the structure, wherein a portion of the cover member is exposed from the opening toward the front surface side, in a state where the latching portion of the functional component is latched on the latch receiving portion of the component receiver, and wherein the functional component has a storing portion that stores the exposed portion of the cover member thereinside.

According to a fifth aspect of the present invention, there may be provided the structure, wherein the component receiver has a pivot restricting portion, and wherein the pivot restricting portion contacts the cover member being pivoted by a given angle so that the opening is opened and restrict the cover member from further pivoting.

According to a sixth aspect of the present invention, there may be provided the structure, wherein the cover member has: pivot shafts extending from both side edges thereof; and a pivot receiving portion formed on a back surface thereof between the pivot shafts, wherein the component receiver has: inner sidewalls extending from both side edges of the opening toward the back surface side thereof; a bottom wall connecting edges of the inner sidewalls; bearing portions formed in the inner sidewalls, to pivotally support the pivot shafts, respectively; and a support projected from the bottom wall toward the opening to support the pivot receiving portion at a tip end thereof.

According to the first aspect of the present invention, when the functional member is removed, the opening formed in the component receiver can be closed by the cover member to conserve a good appearance. Since the cover member is pivotally fitted to the component receiver, the cover member can be managed together with the component receiver and never be lost.

According to the second aspect of the present invention, a cover member fixing portion that contacts the cover member to restrict the cover member from pivoting is formed in the functional component, thereby preventing the cover member from rattling.

According to the third aspect of the present invention, the cover member fixing portion has a pair of contact portions, and the contact portion press both opposite portions of the cover member across a pivot center thereof to provide moments in opposite directions, respectively, thereby preventing the cover member rattling further reliably.

According to the fourth aspect of the present invention, since the functional component is mounted in a state where a portion of the cover member is exposed from the opening, the user is allowed to easily push the exposed portion of the cover member after the functional component is removed to close the opening. Although the portion of the cover member is exposed from the opening when the cover member is pivoted, since the exposed portion is stored inside the storing portion provided in the functional component, the cover member is hidden and invisible from the outside, thereby conserving an appearance.

According to the fifth aspect of the present invention, since the cover member is restricted from further pivoting more than the given angle by the pivot restricting portion provided in the component receiver, when the latching portion of the functional component is inserted into the opening of the component receiver, the cover member does not become obstructive, so that the latching portion can be smoothly stored to be latched onto the latch receiving portion.

According to the sixth aspect of the present invention, since the bearing portions formed in both sidewalls on the back surface side of the component receiver and the support projected from the bottom wall support the cover member at three points, the cover member can be rigidly supported without rattling.

According to an aspect of the present invention, when the functional member is removed, the opening (mounting hole) formed in the component receiver can be closed by the cover member to conserve a good appearance. Since the cover member is pivotally fitted to the component receiver, the cover member can be managed together with the component receiver and never be lost.

DRAWINGS

FIGS. 1A and 1B illustrate a functional component mounting structure according to an embodiment, FIG. 1A illustrating a functional component, FIG. 1B illustrating a component receiver.

FIG. 2A illustrates the functional component observed from obliquely downward, FIG. 2B illustrates a cover member to be fitted to the component receiver, observed from obliquely downward, FIG. 2C illustrates the component receiver in a state where the cover member has been removed, observed from obliquely upward, and FIG. 2D illustrates the component receiver in the same state observed from obliquely downward.

DETAILED DESCRIPTION

Hereinafter, an embodiment will be described with reference to FIG. 1A to FIG. 4B.

Figure 1A:
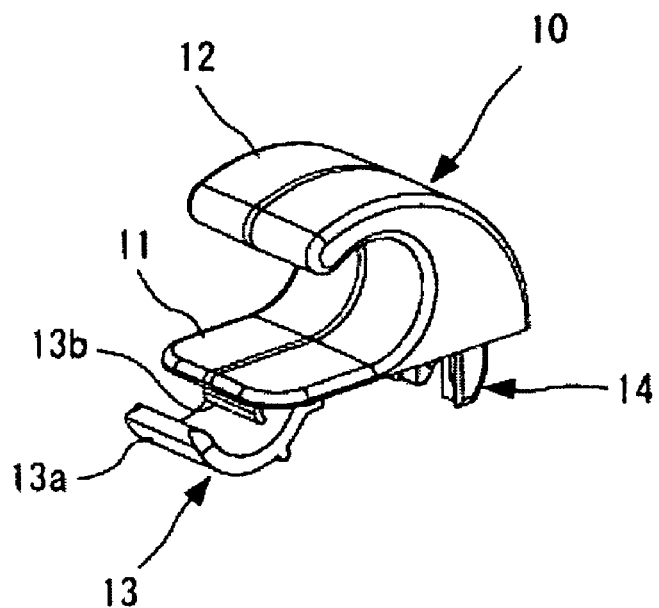
Figure 1B:
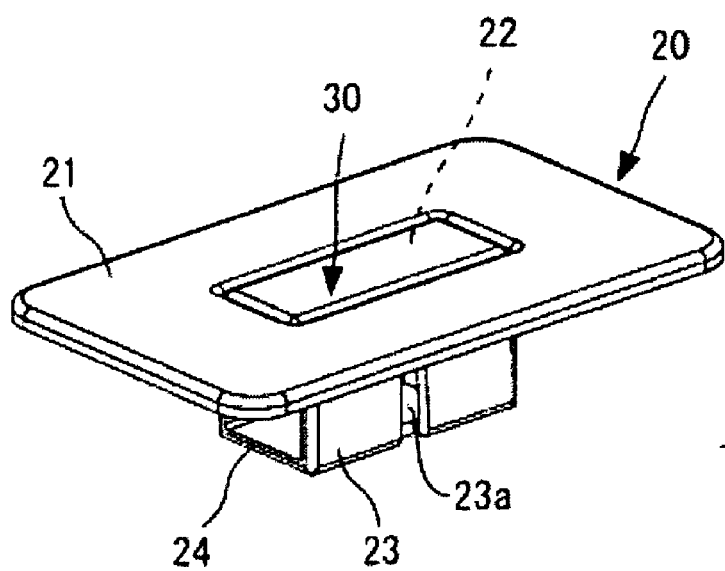

A functional component mounting structure according to the embodiment includes a functional component 10 shown in FIG. 1A and a component receiver 20 shown in FIG. 1B. Either component is formed by resin molding using a metal mold.

The functional component 10 has a functional portion formed on the surface side of a base body 11. In the embodiment, a hook portion 12 for hanging an object is formed as the functional portion.

Figure 2A:
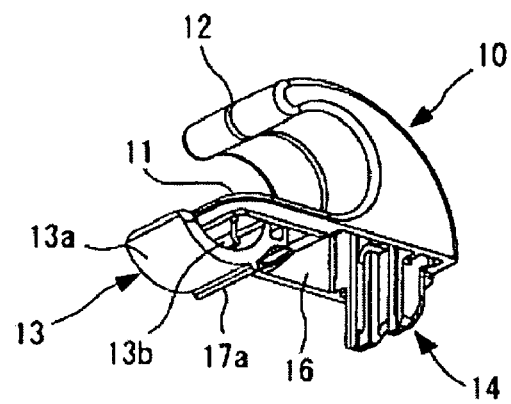

On the back surface of the base body 11, as shown in FIG. 1A and FIG. 2A, a front latching portion 13 extends around a front end portion, and a rear latching portion 14 extends from a rear end portion. The front latching portion 13 includes an elastic pressing portion 13a curved in a circular arc shape and extended so that the tip thereof is disposed forward further than the front end of the base body 11 and a front end contact portion 13b extending perpendicularly from the back surface of the base body 11 to face the elastic pressing portion 13a. A connecting portion between the front latching portion 13 and the base body 11 may be formed into a rounded corner (small curve), not a square corner, so as to prevent stress concentration.

Figure 3A:
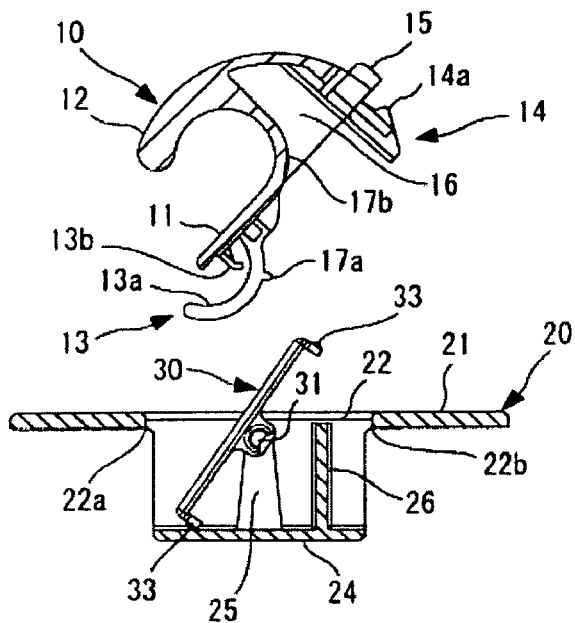
FIGS. 3A to 3C illustrate a procedure for mounting the functional component to the component receiver.
Figure 3B:
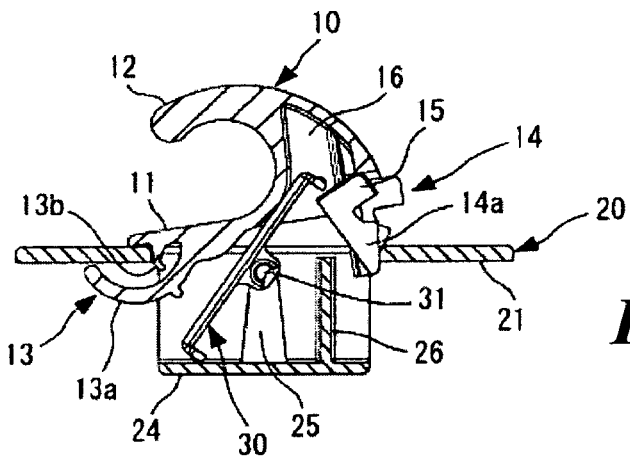
Figure 3C:
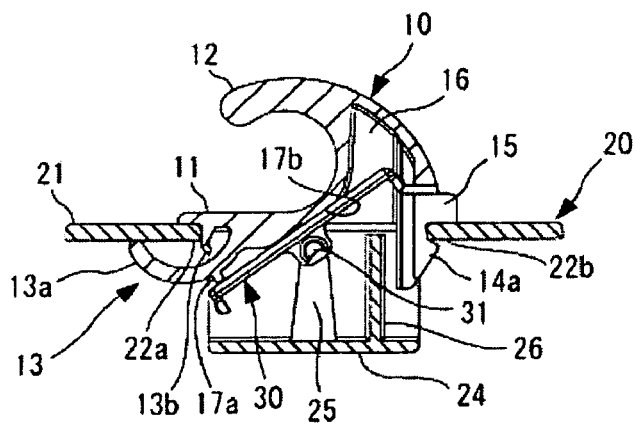

The rear latching portion 14, as shown in FIGS. 3A to 3C, extends almost perpendicularly from the back surface of the base body 11, and has a latching claw 14a formed at an outside surface thereof. The rear latching portion 14 is formed integrally and continuously with a releasing button 15. The release button 15 is disposed so as to be exposed to the front surface side of the base body 11. When this release button 15 is pressed, the rear latching portion 14 is elastically deformed to move the latching claw 14a inside.

Figure 2B:
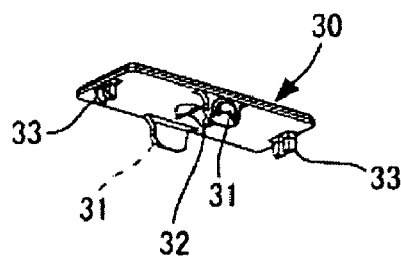
Figure 2C:
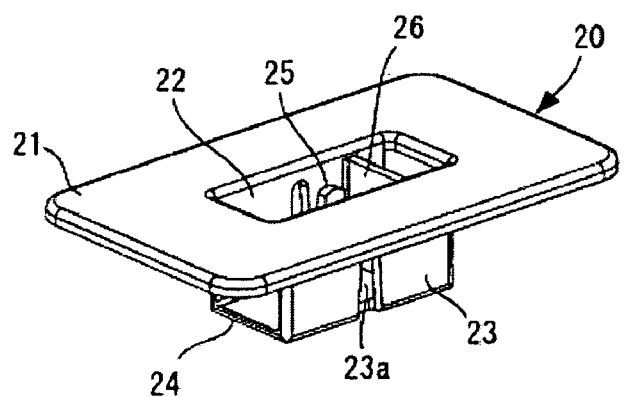
Figure 2D:
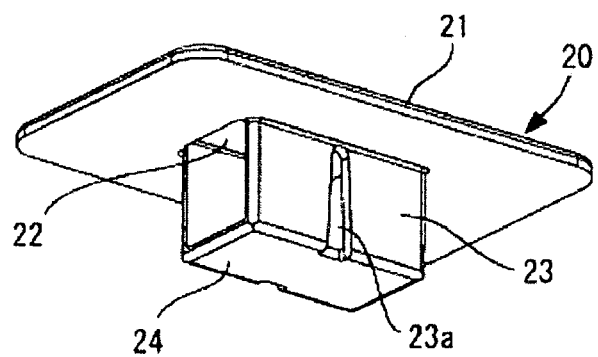

The component receiver 20, as shown in FIG. 1B, and FIG. 2C and FIG. 2D, has a rectangular opening 22 formed in a center part of a plate-like base portion 21. Inner sidewalls 23 facing each other extend from both side edges of the opening 22 on the back surface side, and a bottom wall 24 is formed so as to connect tip edges of these inner sidewalls 23. A support 25 projects toward the opening 22 from a center portion of the bottom wall 24, and a cut-out 23a is formed in each inner sidewall 23 from the bottom wall 24 toward the opening 22 so as to face the support 25. A reinforcing wall 26 is erected from the bottom wall 24 toward the opening 22. Both side ends of the reinforcing wall 26 are connected to the inner sidewalls 23, thereby increasing the rigidity of the bottom wall 24 and the inner sidewalls 23.

The support 25, the reinforcing wall 26 and the cut-out 23a extend in the same direction. Therefore, the component receiver 20 can be formed by using a pair of metal molds opened in the extending direction of these portions, thereby suppressing the fabrication costs of the metal mold.

As shown in FIG. 3C, the front latching portion 13 and the rear latching portion 14 of the functional component 10 are inserted from the opening 22 of the component receiver 20 toward the back surface side. In addition, a front latch receiving portion 22a is formed at a front edge of the opening 22, and a rear latch receiving portion 22b is formed at a rear edge of the opening 22. The front end contact portion 13b of the front latching portion 13 is engaged with the front latch receiving portion 22a, and the latching claw 14a of the rear latching portion 14 is latched on the rear latch receiving portion 22b.

A cover member 30 that opens and closes the opening 22 is pivotally fitted to the component receiver 20. As shown in FIG. 1B and FIG. 2B, the plate-like cover member 30 is formed into a rectangular shape corresponding to the opening 22. As pivot centers, pivot shafts 31 extend outward from center portions of both side edges of the cover member 30, respectively. A pivot receiving portion 32 having a curved concave shape is formed in a center portion of the back surface between the pivot shafts 31.

The tip of the cut-out portion 23a formed in the inner sidewall 23 functions as a bearing portion that pivotally supports the pivot shaft 31 of the cover member 30, and the tip of the support 25 formed in the component receiver 20 supports the pivot receiving portion 32 of the cover member 30, thereby supporting the cover member 30 at three points.

The cover member 30 closes the opening 22 of the component receiver 20 as shown in FIG. 1B. At this time, latching portions 33 (see FIG. 2B) formed at the front and rear edges of the cover member 30 engage with the front and rear edges of the opening 22, respectively, thereby retaining a closed state.

When the cover member 30 closes the opening 22 of the component receiver 20, the cover member 30 is allowed to pivot counterclockwise direction in FIGS. 3A to 3C, thereby opening the opening 22. At a given pivoting angle, the cover member 30 is brought in contact at its front edge with the bottom wall 24 of the component receiver 20, and is restricted from further pivoting, as shown in FIG. 3A. The bottom wall 24 of the component receiver 20 functions as a pivot restricting portion that restricts the cover member 30 from further pivoting. On the other hand, when the cover member 30 closes the opening 22 of the component receiver 20, the cover member 30 is restricted from pivoting in the clockwise direction in FIGS. 3A to 3C, by the reinforcing wall 26.

As shown in FIG. 3A, when the cover member 30 has pivoted to open the opening 22, a rear portion of the cover member 30 is exposed to the front surface side of the component receiver 20. The elastic pressing portion 13a of the front latching portion 13 is inserted into the opening 22 in this state, while the front end contact portion 13b is brought in contact with the front latch receiving portion 22a.

Then, as shown in FIG. 3B and FIG. 3C, the latching claw 14a of the rear latching portion 14 is latched on the rear latch receiving portion 22b. At this time, the elastic pressing portion 13a is elastically deformed, and its elastic force acts so as to make the base body 11 of the functional component 10 closely contact the component receiver 20. The functional component 10 is thus mounted on the component receiver 20.

Figure 4A:
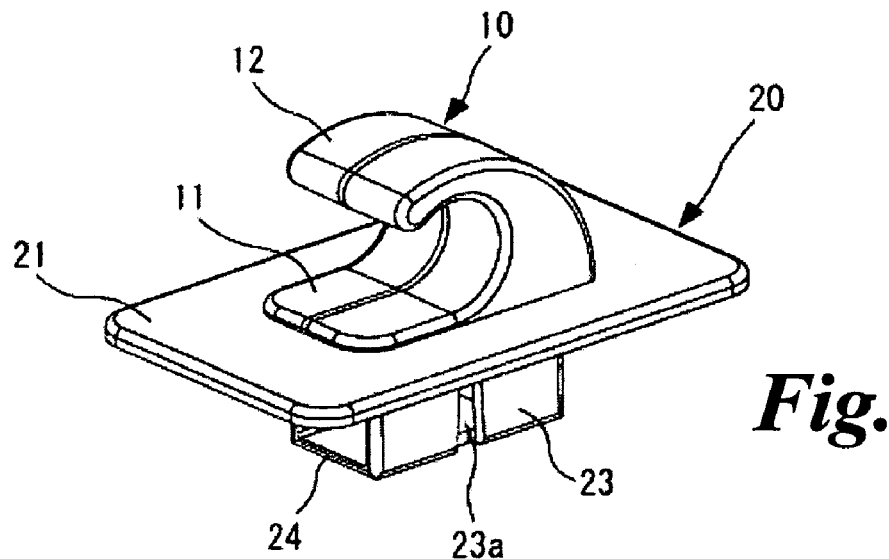
FIG. 4A illustrates a mounted state of the functional component and the component receiver shown in FIGS. 1A and 1B, observed from obliquely upward.
Figure 4B:
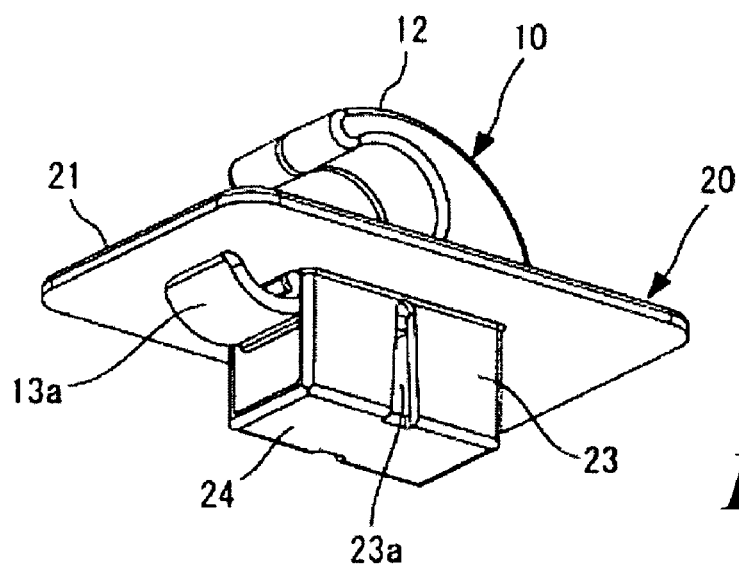
FIG. 4B illustrates the same state observed from obliquely downward.

FIGS. 4A and 4B illustrate a state where the functional component 10 is mounted on the component receiver 20.

In the functional component 10, the hook portion 12 is projected to the front surface side, and a hollow storing portion 16 is formed inside the hook portion 12. When the functional component 10 is mounted on the component receiver 20, the rear portion of the cover member 30 is exposed to the front surface side. However, the exposed rear portion is stored in the storing portion 16 (see FIG. 3C) so that the cover member 30 is hidden and invisible from the outside, thereby conserving an appearance in the mounted state.

In the functional component 10, a front contact portion 17a is provided at an intermediate portion of the elastic pressure portion 13a, and a rear contact portion 17b is provided around an entrance of the storing portion. These contact portions 17a and 17b, contact the front portion and rear portion of the cover member 30 across the pivot center thereof, and press the portions so that moments in opposite directions act thereon, respectively. The front contact portion 17a and the rear contact portion 17b function as a cover member fixing portion that restricts the cover member 30 mounted with the functional component 10 from pivoting. Since the cover member 30 is resin molded so as to be elastically deformed under the moments in opposite directions received at the front portion and rear portion thereof, the contact portions 17a and 17b contact the cover member 30 even with an assembly error and the like, thereby preventing the cover member 30 from rattling. Since one of the contact portions (in the embodiment, the front contact portion 17a) is formed on the elastic pressing portion 13a having elasticity, an assembly error and the like is absorbed also by deforming the elastic pressing portion 13a so that the contact portion 17a and 17b contact the cover member 30, thereby suppressing rattling.

When removing the functional component 10 from the component receiver 20, the release button 15 is pressed so that the rear latching portion 14 is elastically deformed, thereby releasing the latching state between the latching claw 14a and the rear latch receiving portion 22b.

The present invention is not limited to the above embodiment.

For example, the functional portion to be formed on the front surface side of the functional component is not limited to the hook portion 12, and may be a change box, an air freshener storing container, an ETC on-board unit, a portable car navigation system, a radar detector and the like. These functional portions may not necessarily be integrally formed, but may be connected with the base body by use of a double-sided tape, an adhesive, a hook-and-loop fastener and the like.

The component receiver provided with the cover member may be formed integrally with the pillar, front panel and the like of an automobile, not as an independent component as in the above embodiment.

The functional component may be arranged horizontally, vertically, or obliquely.

What is claimed is:

1. A functional component mounting structure comprising:
   a functional component having:
      a base body;
      a functional portion formed on a front surface of the base body; and
      a latching portion extending from a back surface of the base body;
   a component receiver having:
      a base portion having an opening into which the latching portion is inserted from a front surface side to a back surface side thereof; and
      a latch receiving portion on which the latching portion is latched; and
   a cover member pivotally fitted to the component receiver to open and close the opening.

2. The structure of claim 1,
   wherein the functional component has a cover member fixing portion that contacts the cover member to restrict the cover member from pivoting, in a state where the latching portion of the functional component is latched on the latch receiving portion of the component receiver.

3. The structure of claim 2,
   wherein the cover member fixing portion has a pair of contact portions that press both opposite portions of the cover member across a pivot center thereof to provide moments in opposite directions, respectively.

4. The structure of claim 1,
   wherein a portion of the cover member is exposed from the opening toward the front surface side, in a state where the latching portion of the functional component is latched on the latch receiving portion of the component receiver, and
   wherein the functional component has a storing portion that stores the exposed portion of the cover member thereinside.

5. The structure of claim 1,
   wherein the component receiver has a pivot restricting portion, and
   wherein the pivot restricting portion contacts the cover member being pivoted by a given angle so that the opening is opened and restrict the cover member from further pivoting.

6. The structure of claim 1,
   wherein the cover member has:
      pivot shafts extending from both side edges thereof; and
      a pivot receiving portion formed on a back surface thereof between the pivot shafts,
   wherein the component receiver has:
      inner sidewalls extending from both side edges of the opening toward the back surface side thereof;
      a bottom wall connecting edges of the inner sidewalls;
      bearing portions formed in the inner sidewalls, to pivotally support the pivot shafts, respectively; and
      a support projected from the bottom wall toward the opening to support the pivot receiving portion at a tip end thereof.

* * * * *